(12) United States Patent
Lu et al.

(10) Patent No.: US 12,244,196 B2
(45) Date of Patent: Mar. 4, 2025

(54) SALT SPRAY RESISTANT STRUCTURE OF FAN MOTOR ASSEMBLY

(71) Applicant: ASIA VITAL COMPONENTS CO., LTD., New Taipei (TW)

(72) Inventors: Yen-Chih Lu, New Taipei (TW); Ta-Cheng Lee, New Taipei (TW)

(73) Assignee: Asia Vital Components Co., Ltd., New Taipei (TW)

( * ) Notice: Subject to any disclaimer, the term of this patent is extended or adjusted under 35 U.S.C. 154(b) by 215 days.

(21) Appl. No.: 18/154,003

(22) Filed: Jan. 12, 2023

(65) Prior Publication Data
US 2023/0238847 A1 Jul. 27, 2023

(51) Int. Cl.
*H02K 3/44* (2006.01)
*H02K 3/34* (2006.01)

(52) U.S. Cl.
CPC .............. *H02K 3/44* (2013.01); *H02K 3/345* (2013.01)

(58) Field of Classification Search
CPC ...... H02K 1/2786–1/2792; H02K 3/32–3/345; H02K 5/10–5/1285
See application file for complete search history.

(56) References Cited

U.S. PATENT DOCUMENTS

2015/0108876 A1   4/2015   Kojima et al.

FOREIGN PATENT DOCUMENTS

| CN | 203774888 U | 8/2014 |
|----|-------------|--------|
| TW | M451742 U | 4/2013 |
| TW | 201935812 A | 9/2019 |
| TW | M628202 U | 6/2022 |

OTHER PUBLICATIONS

Search Report dated May 1, 2023 issued by Taiwan Intellectual Property Office for counterpart application No. 111103391.

*Primary Examiner* — Ramon M Barrera
(74) *Attorney, Agent, or Firm* — Bradley J. Thorson; DeWitt LLP

(57) ABSTRACT

A salt spray resistant structure of fan motor assembly includes a silicon steel sheet assembly, an insulation support assembly and an encapsulation layer. An inner side of the silicon steel sheet assembly defines a connection hole. A winding assembly is wound on the silicon steel sheet assembly and electrically connected with a circuit board. A first extension section protrudes from the silicon steel sheet assembly into the connection hole to cover a part of the inner side. A bearing cup covers the other part of the inner side. The encapsulation layer encapsulates the insulation support assembly, the winding assembly, the silicon steel sheet assembly and the circuit board so as to achieve salt spray resistant effect.

5 Claims, 3 Drawing Sheets

SALT SPRAY RESISTANT STRUCTURE OF FAN MOTOR ASSEMBLY

This application claims the priority benefit of Taiwan patent application number 111103391 filed on Jan. 26, 2022.

BACKGROUND OF THE INVENTION

1. Field of the Invention

The present invention relates generally to a fan motor assembly, and more particularly to a salt spray resistant structure of fan motor assembly, which can achieve salt spray resistant effect and prevent the inner sides of the silicon steel sheets from rusting.

2. Description of the Related Art

A conventional cooling fan is mainly composed of a stator, a fan impeller, a circuit board and a fan frame. In order to keep the fan normally operating in a harsh environment, it is necessary to prevent salt spray and moisture from infiltrating into the internal structure of the fan. In order to prevent moisture and salt spray from infiltrating into the internal structure of the fan, such as the stator and the circuit board to cause damage of the fan, a conventional gel potting method is employed to encapsulate the stator and the circuit board with a gel encapsulation layer so as to prevent the moisture and salt spray from damaging the stator assembly and the circuit board.

Currently, there are two types of salt spray resisting methods. One is gel potting technique. Prior to potting the gel, an upper insulation support and a lower insulation support are respectively assembled on the upper and lower sides of a silicon steel sheet assembly composed of multiple stacked silicon steel sheets. Then the silicon steel sheet assembly and the upper and lower insulation supports assembled with each other are placed on a wire winding machine. The inner side of the silicon steel sheet assembly is formed with a central perforation. A wire winding mold rod of the wire winding machine is fitted in the perforation. In addition, the inner side of the silicon steel sheet assembly is inward recessed to form two foolproof holes in communication with the perforation. The two foolproof holes are exposed to outer side without being shielded by the upper and lower insulation supports. Two protrusion sections protrude from outer side of the wire winding mold rod of the wire winding machine. The two protrusion sections are inserted and securely located in the two foolproof holes. Thereafter, the wire winding machine starts to perform wire winding operation to the upper and lower insulation supports. After the wire winding operation is completed, one end of the winding is electrically connected with a circuit board disposed on the bottom section of the lower insulation support (by means of such soldering). After a test operation is completed, a motor assembly is formed. Then the gel potting operation is performed to the assembled motor assembly. However, the gel potting mold for performing the gel potting operation to the motor assembly is not really adapted to the motor assembly. Therefore, in the gel potting process, the gel body in the gel potting mold will flow into the perforation of the silicon steel sheets of the motor assembly. As a result, the inner side of the perforation of the silicon steel sheets of the motor assembly is contaminated with residual gel body and is hard to assemble on the bearing cup of the fan. This leads to defective assembly.

To solve the above problem, the manufacturers manufacture the middle tube of the upper and lower mold sections in the gel potting mold in real adaptation to the perforation and the two foolproof holes of the silicon steel sheet assembly. When the motor assembly is placed in the upper and lower mold sections of the gel potting mold really adapted to the motor assembly, the middle tube of the upper and lower mold sections in the gel potting mold is fitted and connected with the inner side of the perforation of the silicon steel sheet assembly. The outer side of the middle tightly attaches to the inner side of the perforation of the silicon steel sheet assembly to seal the same. Also, two protruding bodies protruding from the outer side of the middle tube of the lower mold section are inserted and located in the lower halves of the two foolproof holes to seal the same. Therefore, in gel potting process, the gel body is prevented from flowing into the perforation and the two foolproof holes. Then, it is again ensured that the motor assembly has been securely sealed in the upper and lower mold sections of the gel potting mold without up and down and left and right swinging to cause dislocation of the size of the motor. Then the gel body is filled into the gel potting mold. After the gel body is solidified, the motor assembly potted with the gel is taken out from the gel potting mold. In the gel potting method, the space around the stator and the circuit board is fully filled with the gel to achieve salt spray resisting effect.

In the gel potting process, the perforation and the two foolproof holes of the silicon steel sheet assembly are sealed by the middle tube of the gel potting mold and the two protruding bodies protruding from the outer side of the middle tube. Therefore, the inner sides of the perforation and the two foolproof holes are not encapsulated with the gel. In this case, the motor assembly potted with the gel can be successfully assembled on the bearing cup of the fan. However, this leads to a problem. That is, when the fan operates in a humid and salt spray-full environment, the salt spray or moisture will infiltrate into the perforation and the two foolproof holes of the silicon steel sheet assembly. As a result, the silicon steel sheet assembly is apt to corrode and rust to produce rust water due to the salt spray or moisture. The rust water will flow within the perforation and the two foolproof holes of the silicon steel sheet assembly. Consequently, the entire inner side of the silicon steel sheet assembly will rust. Finally, the rust water in the two foolproof holes will be thrown out with the rotation of the fan and the rust water will be splashed over the interior of the fan. The rust water will lead to clog of the bearing in the fan. Under such circumstance, the fan cannot further operate. In addition, in the assembling process that the wire winding mold rod of the wire winding machine and the middle tube of the gel potting mold are sequentially fitted into the perforation of the silicon steel sheet assembly, the wire winding mold rod and the middle tube often incautiously scrape off the electro-deposition layer coated on the silicon steel sheets. As a result, the rusting of the scraped sections of the inner sides of the silicon steel sheets will be speeded.

The other type of the salt spray resisting methods is vacuum coating technique, in which the assembled motor assembly is directly coated with a coating. The coating is an extremely thin coating formed of polymer for providing salt spray resisting effect for the motor. However, currently, such method cannot be applied to the motor assembly by the manufacturers. This is because that the coating can only temporarily provide salt spray resisting effect for the fan motor in a salt spray-full and humid environment (for such as 50 or less hours). In the case that the fan motor operates in a salt spray-full and humid environment for longer time (such as 750 hours), it is impossible for such coating to provide salt spray resisting effect for the fan motor. This is because after a long period of operation, the coating will be abraded by salt crystal and fractured to lose the salt spray resisting effect. As a result, the salt spray will infiltrate into the fan motor to cause rusting and short-circuit of the circuit board or even burnout of the circuit board. Secondly, in the process that the motor assembly coated with the coating is assembled on the bearing cup of the fan, the coating on the inner side of the silicon steel sheet assembly will be in frictional contact with the outer side of the bearing cup. Therefore, the inner side of the silicon steel sheet assembly is apt to be scraped and damaged to form a breach. The salt spray is easy to infiltrate through the breach into the inner side of the silicon steel sheet assembly to cause rusting thereof. Mainly due to the above factors, the manufacturers will not apply vacuum deposition technique to the fan motor assembly.

It is therefore tried by the applicant to provide a salt spray resistant structure, which can solve the above problems and achieve salt spray resistant effect for the fan motor assembly.

SUMMARY OF THE INVENTION

It is therefore a primary object of the present invention to provide a salt spray resistant structure of fan motor assembly, which can achieve salt spray resistant effect for the fan motor assembly.

It is a further object of the present invention to provide the above salt spray resistant structure of fan motor assembly, in which the notches of the inner side of the silicon steel sheet assembly are covered and sealed to avoid infiltration of salt spray. Accordingly, the salt spray resistant structure can achieve antirust effect for the fan motor assembly.

To achieve the above and other objects, the salt spray resistant structure of fan motor assembly of the present invention includes: a silicon steel sheet assembly having an upper side and a lower side and an outer side and an inner side connected between the upper and lower sides, the inner side circularly defining a connection hole; an insulation support assembly including an upper insulation support and a lower insulation support, the upper and lower insulation supports being respectively disposed on the upper and lower sides of the silicon steel sheet assembly, a winding assembly being wound on the upper and lower insulation supports and electrically connected with a circuit board, a first extension section protruding from one side of the upper insulation support into the connection hole to cover a part or all of the inner side; and an encapsulation layer integrally encapsulating the insulation support assembly, the winding assembly, the silicon steel sheet assembly and the circuit board, the first extension section and the inner side, which are not encapsulated by the encapsulation layer, being fitted with a bearing cup, an outer side of the bearing cup directly or indirectly covering the other part of the inner side.

In the above salt spray resistant structure, the bearing cup has a shoulder section protruding from the outer side of the bearing cup. The first extension section protrudes into the connection hole to c over a part of the inner side of the silicon steel sheet assembly and abut against the shoulder section. An outer side of the shoulder section of the bearing cup directly covers the other part of the inner side of the silicon steel sheet assembly. A second extension section protrudes from one side of the lower insulation support into the connection hole to cover the other part of the inner side of the silicon steel sheet assembly and connect with the first extension section so as to together fully cover the entire inner side of the silicon steel sheet assembly.

In the above salt spray resistant structure, the bearing cup has a shoulder section protruding from the outer side of the bearing cup. The shoulder section abuts against the outer side of the second extension section. The first and second extension sections are interposed between the inner side of the silicon steel sheet assembly and the outer side of the shoulder section so that the inner side of the silicon steel sheet assembly is indirectly covered by the outer side of the shoulder section. The upper and lower insulation supports are integrally or non-integrally formed.

In the above salt spray resistant structure, at least one channel is longitudinally formed on the inner side of the silicon steel sheet assembly. At least one first rib section protrudes from the outer side of the first extension section and longitudinally extends along the first extension section. The first rib section is inlaid and connected in the channel to cover the channel. The inner side of the silicon steel sheet assembly has a configuration identical to a configuration of the outer side of the bearing cup. At least one channel is longitudinally formed on the inner side of the silicon steel sheet assembly. At least one first rib section and at least one second rib section respectively protrude from the outer sides of the first and second extension sections and longitudinally extend along the first and second extension sections. The first and second rib sections are respectively inlaid and connected in an upper half and a lower half of the channel to cover the channel.

At least one channel is longitudinally formed on the inner side of the second extension section opposite to the second rib section. At least one rib section protrudes from the outer side of the bearing cup. The rib section is inlaid in the channel.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
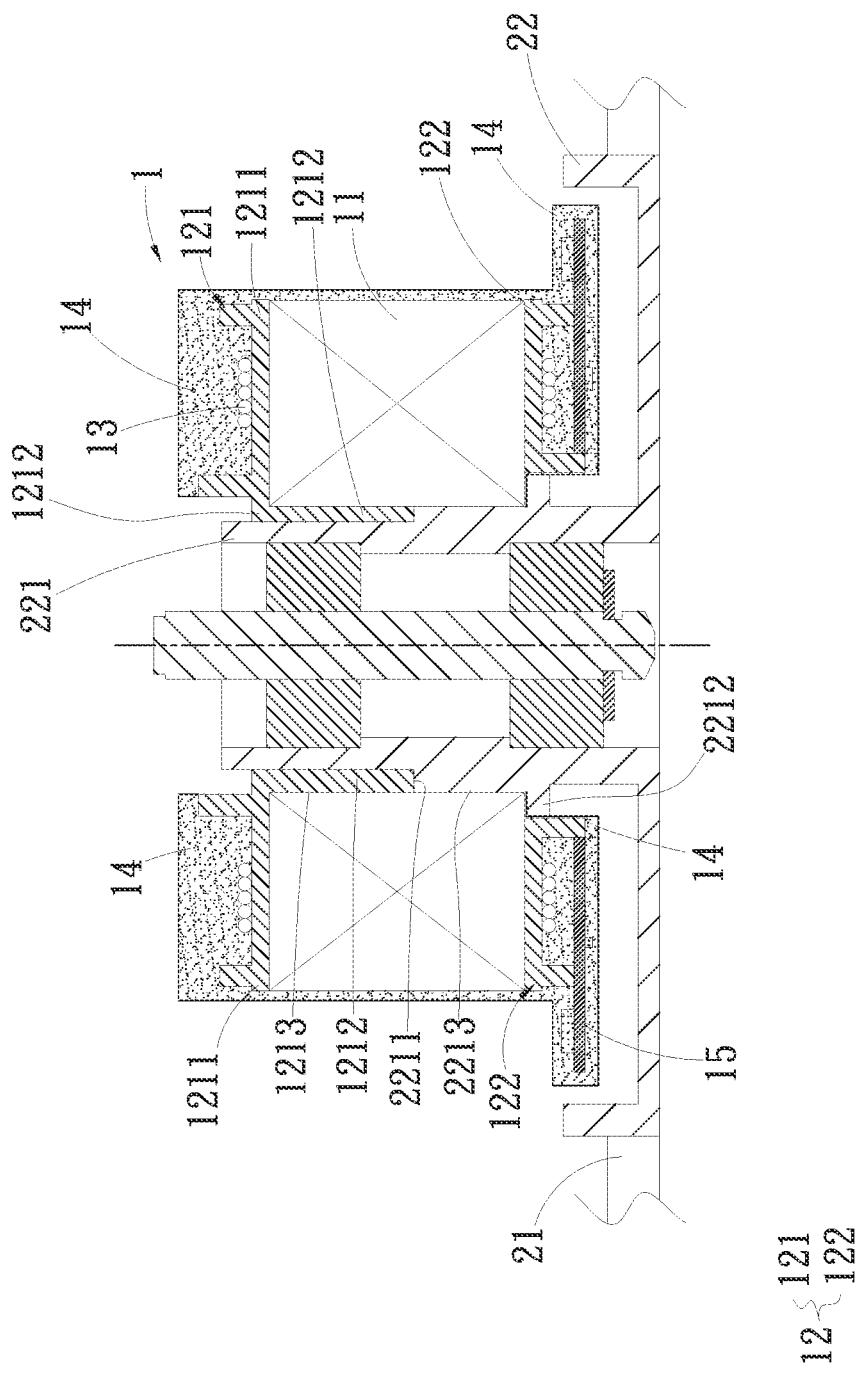
FIG. 1 is a sectional view of the fan motor assembly and the shaft seat of the present invention.
Figure 2:
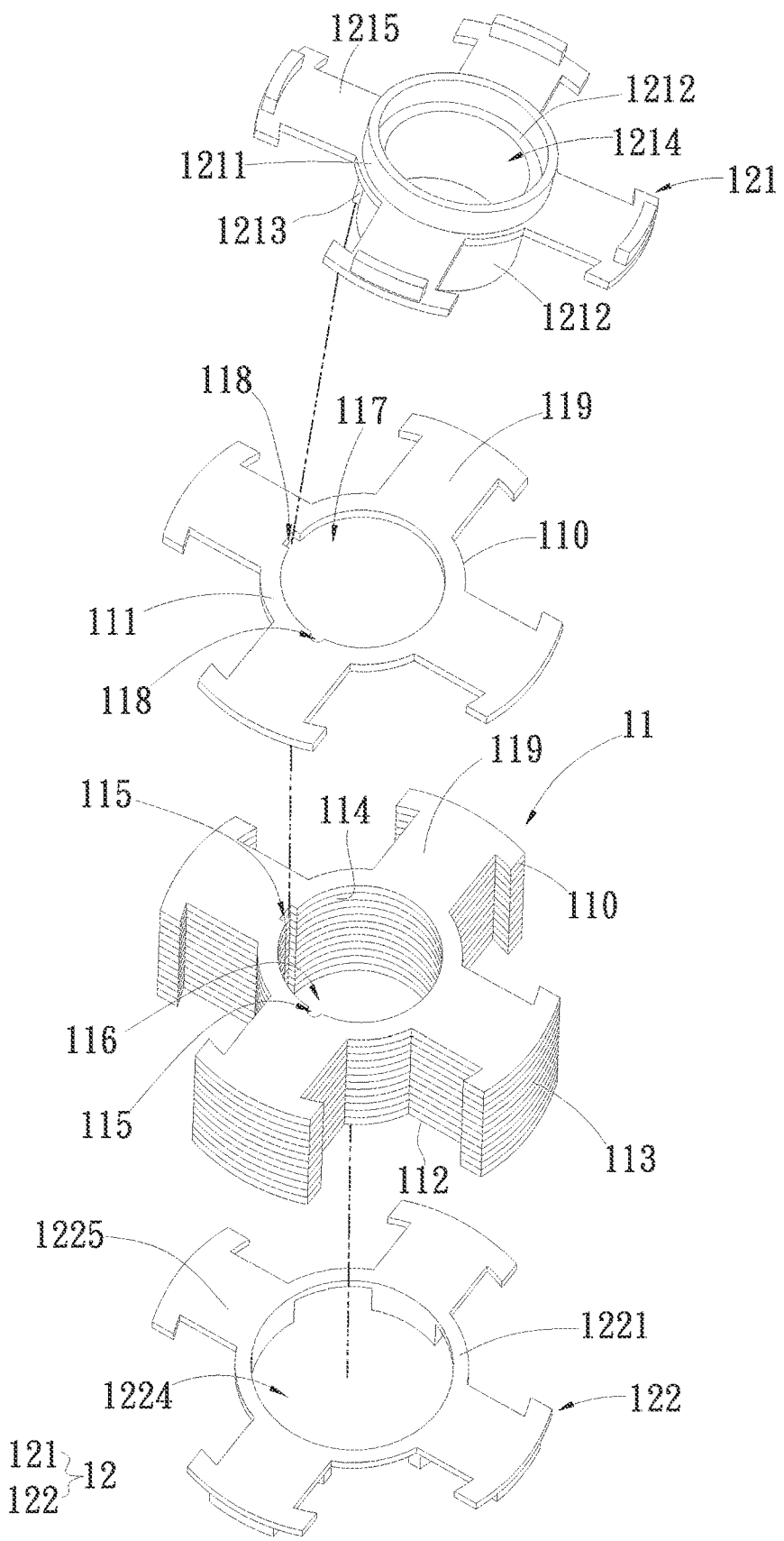
FIG. 2 is a perspective exploded view of the silicon steel sheet assembly and the upper and lower insulation supports of the present invention.
Figure 3:
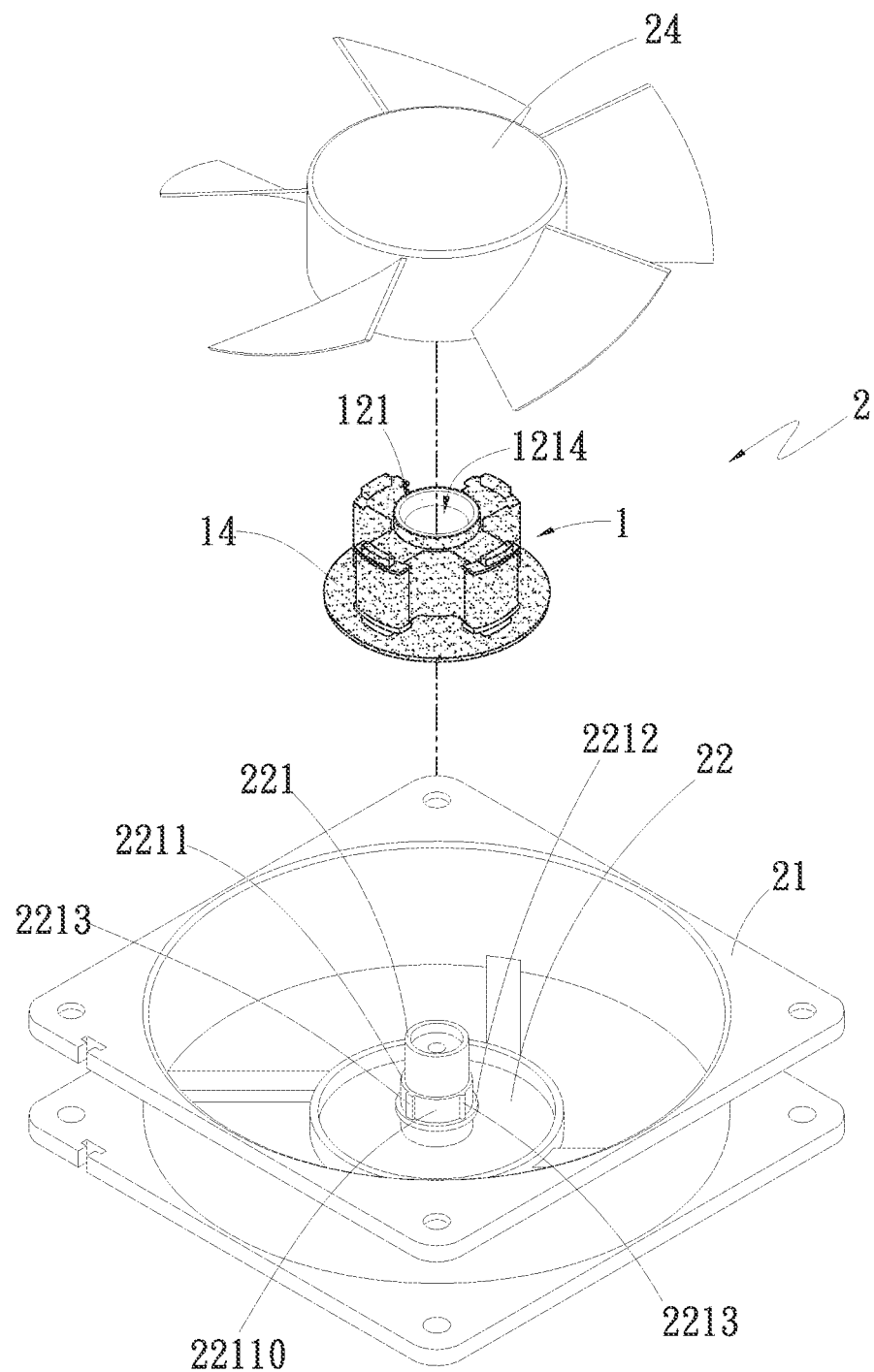
FIG. 3 is a perspective exploded view of the fan of the present invention.

Please refer to FIGS. 1, 2 and 3. According to a preferred embodiment, the salt spray resistant structure 1 of fan motor assembly of the present invention is applied to a fan 2 such as an axial-flow fan, a centrifugal fan, etc. The fan 2 includes a fan frame 21, a fan impeller 24 and a motor assembly, (that is, the salt spray resistant structure 1 of fan motor assembly of the present invention). A shaft seat 22 is disposed at a center of the fan frame 21. A bearing cup 221 protrudes from the shaft seat 22 and the motor assembly is fitted on the bearing cup 221. The bearing cup 221 can be a metal bearing cup 221 (such as copper bearing cup 221) or a plastic bearing cup 221. The fan impeller 24 is receiving in the fan frame 21. A shaft is disposed at a center of the fan impeller 24 and pivotally disposed in the bearing cup 221. The motor assembly is encased in the fan impeller 24. A magnetic member is disposed in the fan impeller 24 for induction and magnetization with the motor assembly. In practice, the fan can be alternatively a fan of other type (such as a centrifugal fan).

The salt spray resistant structure 1 of fan motor assembly, (that is, the motor assembly), includes a silicon steel sheet assembly 11, an insulation support assembly 12 and an encapsulation layer 14. The silicon steel sheet assembly 11 is composed of multiple stacked silicon steel sheets 110. The silicon steel sheet assembly 11 has an upper side 111 and a lower side 112 and an outer side and an inner side 114 connected between the upper and lower sides 111, 112. The inner side 114 circularly defines a connection hole 116. That is, each silicon steel sheet 110 is formed with a central hole 117. The central holes 117 of the silicon steel sheets 110 are longitudinally (axially) stacked with each other to form the connection hole 116. The bearing cup 221 is fitted in the connection hole 116. When assembling the fan 2, the connection hole 116 of the silicon steel sheet assembly 11 of the motor assembly of the present invention is for the bearing cup 221 to securely fit therein. In addition, in potting operation and wire winding operation, the connection hole 116 of the silicon steel sheet assembly 11 is for a wire winding mold rod of a wire winding machine (not shown) to fit therein and for a middle tube of an upper mold section and a lower mold sections in a potting mold (not shown) to fit therein.

Moreover, the inner side 114 of each silicon steel sheet 110 is inward recessed (in a direction to the outer side 113) to form at least one notch 118. In this embodiment, there are two notches 118 in communication with the central hole 117. The notches 118 of the inner sides 114 of the silicon steel sheets 110 of the silicon steel sheet assembly 11 are longitudinally stacked with each other to form at least one channel 115 (as shown in FIG. 2). The channel 115 (there are two channels 115 in this embodiment) has foolproof and locating function. Two protrusion sections outward protruding from the wire winding mold rod of the wire winding machine (not shown) can be inserted and located in the channels 115 to facilitate wire winding operation. Also, two protruding bodies outward protruding from the middle tube of the lower mold section of the potting mold can be inserted and located in the channels 115 to facilitate potting operation.

The insulation support assembly 12 includes an upper insulation support 121 and a lower insulation support 122. The upper and lower insulation supports 121, 122 are respectively disposed on the upper and lower sides 111, 112 of the silicon steel sheet assembly 11, whereby the silicon steel sheet assembly 11 is sandwiched between the upper and lower insulation supports 121, 122. A winding assembly 13 is radially wound on the upper and lower insulation supports 121, 122, whereby the winding assembly 13 and the silicon steel sheet assembly 11 sandwiched between the upper and lower insulation supports 121, 122 together form a stator. Two electro-conductive supports (not shown) outward protrude from the lower insulation support 122. A head end and a tail end of the winding assembly 13 are respectively secured to the two electro-conductive supports. One end of the two electro-conductive supports passes through the lower insulation support 122 to electrically connect with the silicon steel sheet assembly 11. The other end of the two electro-conductive supports and the head end and the tail end of the winding assembly 13 thereon are soldered on a circuit board 15 and electrically connected therewith. Accordingly, the upper and lower insulation supports 121, 122, the silicon steel sheet assembly 11, the winding assembly 13 and the circuit board 15 together form a motor assembly without potting. In this embodiment, the upper and lower insulation supports 121, 122 are, but not limited to, non-integrally formed for illustration. Alternatively, the upper and lower insulation supports 121, 122 can be integrally formed.

In addition, the upper insulation support 121 has an upper insulation support main body 1211. The upper insulation support main body 1211 has a first through hole 1214 and multiple upper protective plate sections 1215. The first through hole 1214 is aligned with the connection hole 116. The multiple upper protective plate sections 1215 radially outward extend from outer wall of the upper insulation support main body 1211. The upper protective plate sections 1215 serve to cover upper sides 111 of multiple poles 119 of the silicon steel sheet assembly 11. In addition, a first extension section 1212 outward protrudes from one side of the upper insulation support main body 1211. The first extension section 1212 downward extends from a circumference of bottom section of the upper insulation support main body 1211 along the first through hole 1214 into the connection hole 116 of the silicon steel sheet assembly 11. The first extension section 1212 covers (or shades or shields) a part of the inner side 114 of the silicon steel sheet assembly 11, (such as an upper half of the inner side 114) or all of the inner side 114 of the silicon steel sheet assembly 11, (such as the entire inner side 114 of the silicon steel sheet assembly 11). At least one first rib section 1213 protrudes from outer side of the first extension section 1212 and longitudinally extends along the first extension section 1212. The first rib section 1213 (there are two first rib sections 1213 shown in the drawing) is inlaid and connected in the channel 115 of the silicon steel sheet assembly 11, (such as the upper halves of the two channels 115), to cover the channel 115. (The first rib section 1213 has a configuration in adaptation to the configuration of the channel 115). The first rib section 1213 serves to seal the channel 115 so as to prevent external moisture or salt spray from entering the channel 115, whereby the inner side 114 of the silicon steel sheet assembly 11 is prevented from rusting. In the present invention, the first extension section 1212 and the first rib section 1213 respectively cover and seal the inner side 114 and the channel 115. This effectively solves the problems of the conventional fan motor that the salt spray infiltrates through the perforation and foolproof holes of the silicon steel sheet assembly to corrode the windings and the silicon steel sheets and cause rusting and expulsion of rust water to lead to clogging of the internal bearing of the fan 2.

The lower insulation support 122 corresponds to the upper insulation support 121 and has a lower insulation support main body 1221. The second insulation support main body 1221 has a second through hole 1224 and multiple lower protective plate sections 1225. The second through hole 1224 is aligned with the connection hole 116. The multiple lower protective plate sections 1225 radially outward extend from outer wall of the lower insulation support main body 1221. The lower protective plate sections 1225 serve to cover lower sides 112 of the multiple poles 119 of the silicon steel sheet assembly 11.

Please further refer to FIGS. 1 and 3. The encapsulation layer 14 integrally encapsulates the insulation support assembly 12, the winding assembly 13, the silicon steel sheet assembly 11 and the circuit board 15. The first extension section 1212 and the inner side 114, which are not encapsulated by the encapsulation layer 14, are fitted with the bearing cup 221. The outer side of the bearing cup 221 directly or indirectly covers the other part of the inner side 114. In this embodiment, the assembled motor assembly is placed in the upper and lower mold sections of the potting mold and then the potting operation is performed. After the gel in the potting mold is solidified, the encapsulation layer 14 simply encapsulates the insulation support assembly 12, the winding assembly 13, the upper and lower sides 111, 112 and the outer side 113 of the silicon steel sheet assembly 11 and the circuit board 15, while the entire inner side 114 of the silicon steel sheet assembly 11 is not encapsulated by the encapsulation layer 14. In addition, the outer side of the first extension section 1212 of the upper insulation support 121 attaches to and covers the upper half of the inner side 114 of the silicon steel sheet assembly 11. The inner side of the first extension section 1212 tightly attached to the upper half of the outer side of the bearing cup 221. The lower half of the outer side of the bearing cup 221 directly attaches to and covers the lower half of the inner side 114 of the silicon steel sheet assembly 11. Accordingly, the external salt spray is prevented from infiltrating into the inner side 114 of the silicon steel sheet assembly 11 so as to achieve anticorrosion effect. In addition, in practice, by means of gel dispensing, a gel body can be painted between the contact positions of the outer side of the first extension section 1212 and the upper half of the inner side 114 of the silicon steel sheet assembly 11 and between the contact positions of the lower half of the inner side 114 of the silicon steel sheet assembly 11 and the lower half of the outer side of the bearing cup 221. The gel body serves to enhance the sealing and connection effect for the contact positions.

The outer side of the bearing cup 221 has a configuration identical to the configuration of the inner side 114 of the silicon steel sheet assembly 11. That is, the configuration of the outer side of the bearing cup 221 is varied with the change of the configuration of the inner side 114 of the silicon steel sheet assembly 11. The bearing cup 221 has a shoulder section 2211 protruding from the outer side of the bearing cup 221. The shoulder section 221 abuts against one end (a free end) of the first extension section 1212 covering the inner side 114. The outer side 22110 of the shoulder section 2211 of the bearing cup 221 directly attaches to and covers the other part of the inner side 114 of the silicon steel sheet assembly 11 (the lower half of the inner side 114). In addition, at least one rib section 2213 outward protrudes from the outer side 22110 of the shoulder section 2211 corresponding to the position of the channel 115. The rib section 2213 (there are two rib sections 2213 shown in the drawing) is inlaid in the lower half of the channel 115 in connection with the first rib section 1213 of the upper insulation support 121. Moreover, the encapsulation layer 14 outside the lower side 112 of the silicon steel sheet assembly 11 is in abutment and contact with an upper plane face of a flange 2212 protruding from outer side of the bearing cup 221. A lateral plane face of the flange 2212 is in attachment and contact with the encapsulation layer 14 outside a lateral face of the lower insulation support main body 1221. The flange 2212 not only provides support effect, but also enhances the sealing effect between the encapsulation layer 14 outside the lower side 112 of the silicon steel sheet assembly 11 and the encapsulation layer 14 outside the lower side 112 of the lower insulation support main body 1221 so as to enhance the salt spray resistant effect. However, in practice, the flange 2212 can be omitted and simply the outer side 22110 of the shoulder section 2211 of the bearing cup 221 tightly covers the lower half of the inner side 114 of the silicon steel sheet assembly 11. This is sufficient to achieve the salt spray resistant effect and antirust effect.

In a modified embodiment, the structure and configuration of the lower insulation support 122 are identical to those of the upper insulation support 12. That is, a second extension section protrudes from one side of the lower insulation support main body 1221. The second extension section upward extends from a circumference of bottom section of the lower insulation support main body 1221 along the second through hole 1224 into the connection hole 116 of the silicon steel sheet assembly 11. The second extension section covers the other part of the inner side 114 of the silicon steel sheet assembly 11, (such as the lower half of the inner side 114). One end (a free end) of the second extension section tightly integrally abuts against the free end of the first extension section 1212 to together cover the entire inner side 114 of the silicon steel sheet assembly 11 for avoiding infiltration of salt spray. In addition, the shoulder section 2211 of the bearing cup 221 abuts against the outer side of the second extension section of lower insulation support 122. The first and second extension sections 1212 are interposed between the inner side 114 of the silicon steel sheet assembly 11 and the bearing cup 221 and the outer side 22110 of the shoulder section 2211 so that the inner side 114 of the silicon steel sheet assembly 11 is indirectly covered by the bearing cup 221 and the outer side 22110 of the shoulder section 2211. At least one second rib section protrudes from the outer side of the second extension section and longitudinally extends along the second extension section. At least one channel is longitudinally formed on the inner side of the second extension section opposite to the second rib section. The second rib section (there are two second rib sections shown in the drawing) is inlaid and connected in the lower half of the channel 115 of the silicon steel sheet assembly 11 to cover the lower half of the channel 115. The second rib section is in connection with the first rib section 1213 covering the upper half of the channel 115 to together seal the entire channel 115, whereby the external moisture or salt spray cannot enter the channel 115 so as to prevent the inner side 114 of the silicon steel sheet assembly 11 from rusting. The two protrusion sections of the wire winding mold rod of the wire winding machine (not shown) can be inserted and located in the channel to facilitate wire winding operation. Also, the two protruding bodies of the middle tube of the lower mold section of the potting mold can be inserted and located in the channels to facilitate potting operation. Moreover, when assembling the fan 2, the rib section 2213 of the bearing cup 221 of the fan 2 can be correspondingly inlaid in the channel.

By means of the design of the salt spray resistant structure 1 of the motor assembly of the fan 2 of the present invention, the inner side 114 of the silicon steel sheet assembly 11 is covered and sealed by the first extension section 1212 of the upper insulation support 121 and the outer side of the bearing cup 221 or covered and sealed by the first and second extension sections 1212 of the insulation support assembly 12. Therefore, a salt spray resistant effect and an antirust effect are effectively provided for the inner side 114 of the silicon steel sheet assembly 11.

The present invention has been described with the above embodiments thereof and it is understood that many changes and modifications in such as the form or layout pattern or practicing step of the above embodiments can be carried out without departing from the scope and the spirit of the invention that is intended to be limited only by the appended claims.

What is claimed is:

1. A salt spray resistant structure of fan motor assembly, comprising:

a silicon steel sheet assembly having an upper side and a lower side and an outer side and an inner side connected between the upper and lower sides, the inner side circularly defining a connection hole;

an insulation support assembly including an upper insulation support and a lower insulation support, the upper and lower insulation supports being respectively disposed on the upper and lower sides of the silicon steel sheet assembly, a winding assembly being wound on the upper and lower insulation supports and electrically connected with a circuit board, a first extension section protruding from one side of the upper insulation support into the connection hole to cover a part of the inner side; and an encapsulation layer integrally encapsulating the insulation support assembly, the winding assembly, the silicon steel sheet assembly and the circuit board, the first extension section and the inner side, which are not encapsulated by the encapsulation layer, being fitted with a bearing cup, an outer side of the bearing cup directly covering the other part of the inner side.

2. The salt spray resistant structure of fan motor assembly as claimed in claim 1, wherein the bearing cup has a shoulder section protruding from the outer side of the bearing cup, the first extension section protruding into the connection hole to cover a part of the inner side of the silicon steel sheet assembly and abut against the shoulder section, an outer side of the shoulder section of the bearing cup directly covering the other part of the inner side of the silicon steel sheet assembly.

3. The salt spray resistant structure of fan motor assembly as claimed in claim 1, wherein the upper and lower insulation supports are non-integrally formed.

4. The salt spray resistant structure of fan motor assembly as claimed in claim 1, wherein at least one channel is longitudinally formed on the inner side of the silicon steel sheet assembly, at least one first rib section protruding from the outer side of the first extension section and longitudinally extending along the first extension section, the first rib section being inlaid and connected in the channel to cover the channel.

5. The salt spray resistant structure of fan motor assembly as claimed in claim 1, wherein the inner side of the silicon steel sheet assembly has a configuration identical to a configuration of the outer side of the bearing cup.

* * * * *